Jan. 12, 1926.  1,569,490
J. H. HISCOCK
MEANS FOR GUIDING RADIAL ROUTERS
Filed June 20, 1924     2 Sheets-Sheet 1

INVENTOR
JOSEPH H. HISCOCK
ATTORNEYS

Jan. 12, 1926.
J. H. HISCOCK
1,569,490
MEANS FOR GUIDING RADIAL ROUTERS
Filed June 20, 1924  2 Sheets-Sheet 2
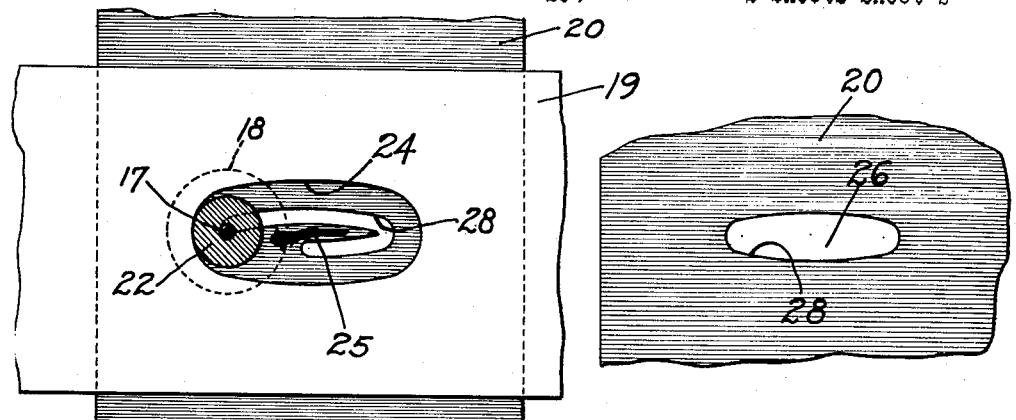
Fig. 4  Fig. 5
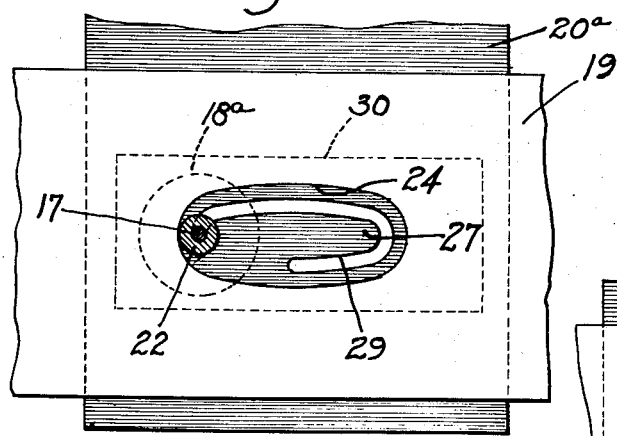
Fig. 6  Fig. 7
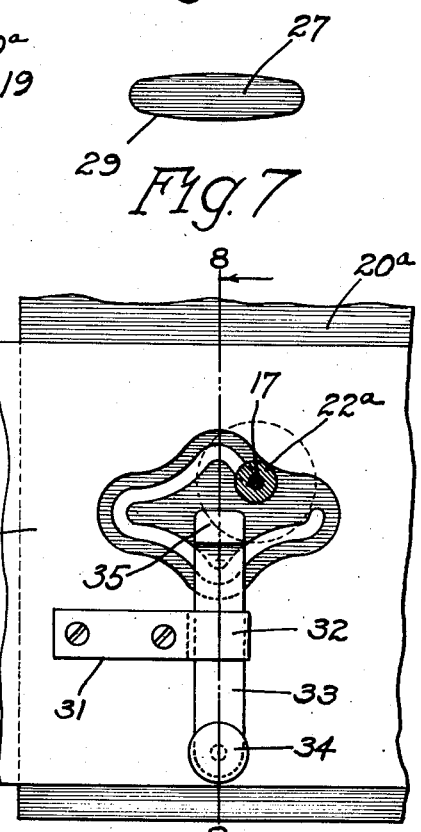
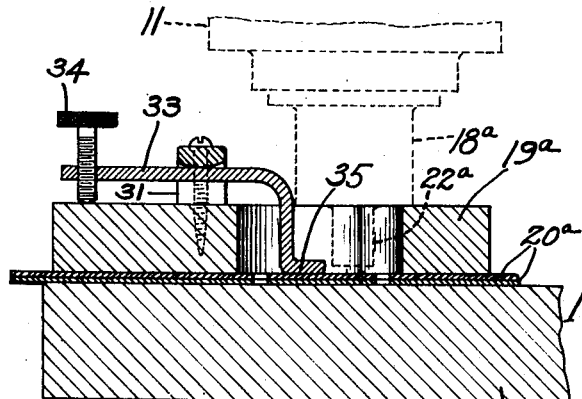
Fig. 8  Fig. 9
INVENTOR
JOSEPH H. HISCOCK
BY Paul, Paul & Moore
ATTORNEYS Patented Jan. 12, 1926.

1,569,490

UNITED STATES PATENT OFFICE.

JOSEPH H. HISCOCK, OF MINNEAPOLIS, MINNESOTA.

MEANS FOR GUIDING RADIAL ROUTERS.

Application filed June 20, 1924. Serial No. 721,265.

*To all whom it may concern:*

Be it known that I, JOSEPH H. HISCOCK, a citizen of the United States, resident of Minneapolis, county of Hennepin, and State of Minnesota, have invented certain new and useful Improvements in Means for Guiding Radial Routers, of which the following is a specification.

This invention relates to an improved means for guiding the cutting tool or bit of a radial router so that such router may be used for cutting out or removing from sheets of veneering, knots or imperfect or decayed portions; and also by the use of which such router may be utilized in cutting from a sound piece of veneer, a patch adapted to be fitted into the aperture formed by the removal of the defective portion so that the thus patched sheet of veneer may be used in the manufacture of high grade furniture.

In the manufacture of furniture or other wood specialties employing the use of veneers in the construction thereof, it is preferable that all such veneers be free from loose knots or other imperfections in order that the beauty or appearance of the article when completed will not be marred or rendered less valuable by the presence of such imperfections or defective portions, and it is therefore desirable that means be provided whereby such imperfections may readily be removed from a sheet of veneer, and sound portions or patches substituted therefor in order that the entire sheet of veneer may be utilized without waste.

The novel means featured in this invention for guiding the cutting tool or bit of a radial router consists, generally, in the provision of a pair of guide-collars, each being adapted to be demountably secured to the usual frame of the router, concentric to the cutting tool thereof, and said tool passing therethrough and having its cutting-end terminating slightly beyond the lower face of the guide collar so as to engage the sheet of veneer. These collars are of different sizes, the larger being used when cutting out the defective portion of a sheet of veneer, and the smaller collar being used when cutting out a patch to be fitted into the aperture or opening formed by the removal of a defective portion of the veneer; a simple pattern or template being employed to properly guide the collar and therefore the cutting tool of the router in the use thereof. By the use of this novel guiding means a radial router may also be used for cutting out patches or pieces of veneer for inlay work, and it may also be used for cutting apertures or openings in veneered surfaces adapted to receive such inlays.

The particular object of this invention, therefore, is to provide a simple and inexpensive means for guiding a radial router.

Other objects of the invention will appear from the following description and the accompanying drawings and will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming a part of this specification,

Figure 4 is a sectional plan view on the line 4—4 of Figure 2;

Figure 5 is a plan view of a portion of a sheet of veneer showing an aperture formed by the removal of a defective portion thereof, as in Figures 2 and 4;

Figure 6 is a sectional plan view on the line 6—6 of Figure 3;

Figure 7 is a plan view of a patch cut from a sheet of veneer as in Figures 3 and 6;

Figure 8 is a detail sectional view showing a form of clamp for holding the patches when a plurality of such patches are cut at one time; and Figure 9 is a plan view of Figure 8 showing the cutting of a patch having an irregular outline.

Figure 1:
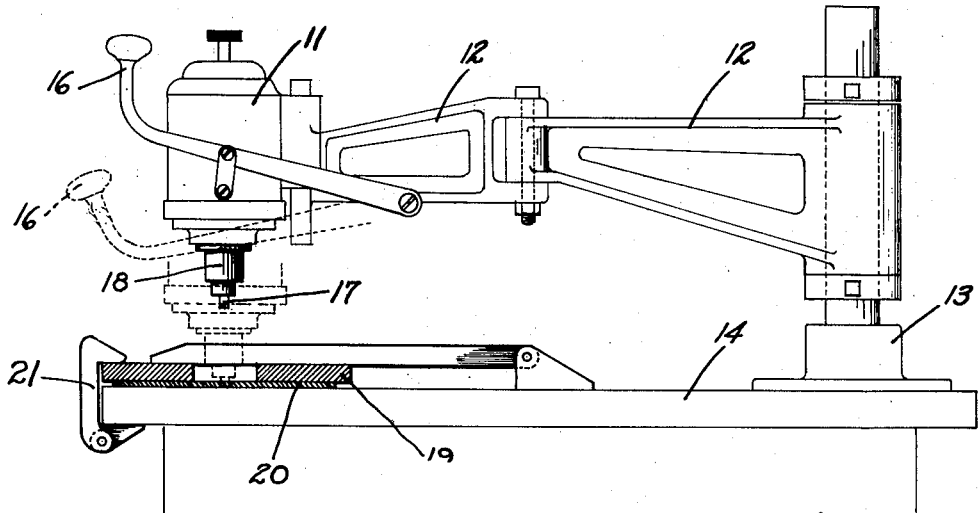
Figure 1 is a side elevation of a radial router with my invention applied thereto.

In the selected embodiment of the invention here shown there is illustrated a radial router of ordinary construction, comprising the usual motor 11 mounted for vertical movement upon a jointed supporting arm 12 which is pivotally mounted upon a standard 13, here shown as secured to the top 14 of an ordinary table or bench 15. The usual hand operating arm or lever 16 is shown pivoted to the outer section of the supporting arm 12, and this lever has a link connection with the motor 11 so that the motor, carrying the cutting tool or router bit 17 may be conveniently raised and lowered by the simple manipulation of the hand lever 16. The conventional form of motor here shown may be either electrically or air operated, and is retained in raised inoperative position by means of a compensating spring, not shown.

The novel means featured in this invention for guiding the router bit or tool 17 in the operation thereof, consists preferably in the provision of a suitable guide collar 18 here shown as being demountably secured to the lower portion of the motor frame of the router, and adapted for operation within a suitable pattern or template 19 between which and the table top 14 the sheet of veneer 20 is held by suitable means such as a clamp 21, while a defective portion is being removed therefrom or while a patch is being cut for insertion therein.

Figure 2:
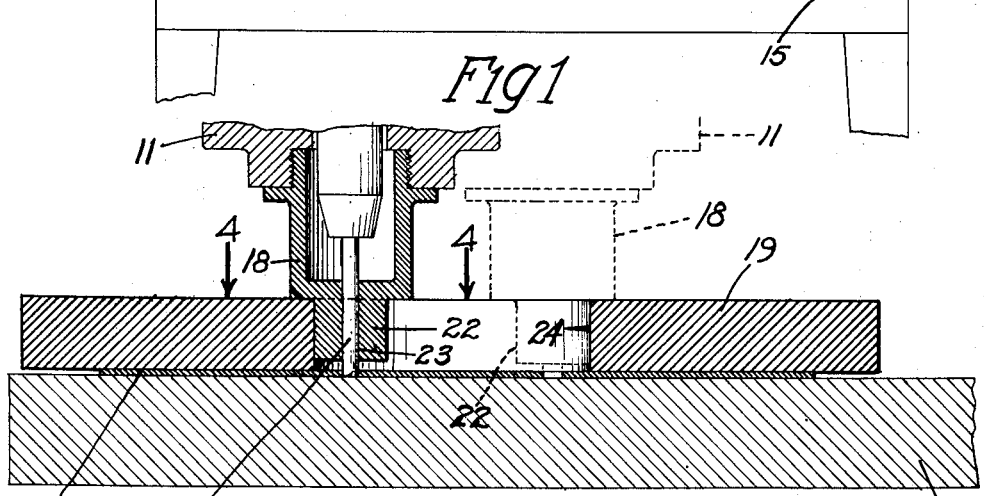
Figure 2 is an enlarged detail sectional view showing the guide collar used when removing a defective portion from a sheet of veneer.

The guide collar has one end tapped into the frame of the router as shown in Figure 2 and its opposite end is adapted to slide on the surface of the pattern 19 as shown in said figure and a reduced extension 22 preferably cylindrical in form depends within the pattern opening and has a bore 23 therethrough to receive the spindle or shank of the cutting tool or drill 17, the cutting end of which protrudes beyond the end of the extension in position to engage and cut the veneer. The wall of the extension 22 bears on the wall of the opening in the pattern and thus forms a guide for the bit, insuring the uniform spacing of the bit from the wall of the pattern opening. The above description refers to the construction shown in Figure 2 of the drawing wherein I illustrate the manner of removing the defective portion of the veneer, various forms of patterns being employed according to the shape and size of the defect in the veneer, the opening in the pattern being varied in form to suit different shapes and sizes of defects.

Figure 3:
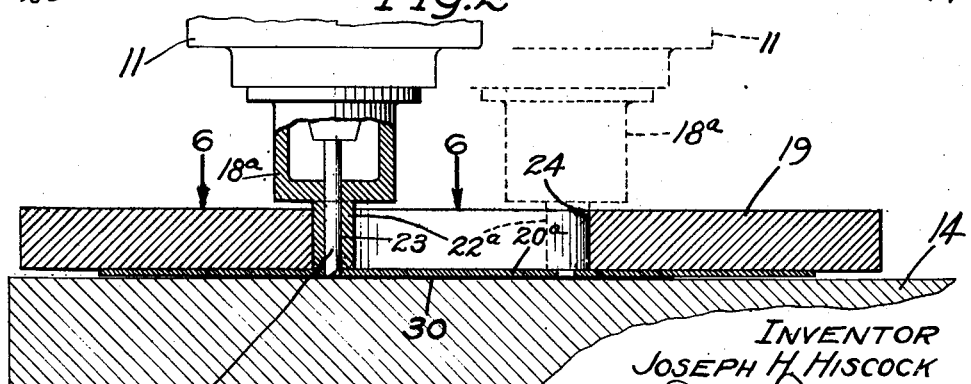
Figure 3 is a similar view showing the collar used when cutting or forming a patch.

In Figure 3 I have illustrated a guide collar 18ª mounted on the machine frame in a similar manner but having preferably a smaller extension 22ª which projects into the opening in the pattern bearing on the wall thereof, over the sheet of veneer 20ª from which it is desired to cut the perfect piece of veneer for patching purposes. When using this collar for cutting out a patch, a pattern 19ᵇ is used which preferably is slightly thinner than the pattern 19, shown in Figure 2, so that the bottom face of the extension 22ª may bear upon the sheet of veneer and thereby tend to hold the veneer firmly against the table top 14 while cutting out the patch. The extension, and therefore the router bit, will be guided by being held in contact with the wall of the pattern opening in a manner similar to that shown and described with reference to Figure 2, but the shoulder or lower face of the collar 18ª will not contact with the top surface of the pattern as does the collar 18 in Figure 2. When using the extension 22ª the router bit will be adjusted to protrude through the end of the extension a distance sufficient to allow it to cut through the veneer only.

It will be noted by referring to Figures 2 and 3 and also Figures 5 and 6 that the extensions 22 and 22ª of the collars 18 and 18ª, respectively, are not of the same diameter, the difference between the diameters of the two extensions being determined by the size or diameter of the router bit used. Thus, if a $\frac{3}{16}$ inch router bit is used and the smaller extension 22ª is made ⅜ inch diameter, then the larger extension 22 must be ¾ inch in diameter, or the diameter of the smaller extension 22ª (⅜ inch) plus two times the diameter of the router bit ($\frac{3}{16}$ inch) which equals ¾ inch. The purpose of making the two extensions of different diameters as above described will be readily seen and understood by referring to Figures 4 and 6. In Figure 4, the larger extension 22 is shown used in the operation of removing a defective portion from a sheet of veneer. In this figure it will be noted that the router bit 17 is spaced a considerable distance from the guide wall 24 of the opening in the pattern 19, thus removing only the defective portion 25 from the veneer and thus forming an aperture 26 therein as shown in Figure 5.

The necessity for a difference in diameter of the guide collars which is exactly twice the diameter of the router bit will be understood when it is realized that the bit for cutting out the imperfect portion of the veneer or making a recess or depression in inlay work operates in the opening made or on the inner side of the edge of the opening while the bit that cuts out the patch or the piece of inlay operates outside the edge of the patch so that the patch or inlay when cut out will exactly fit the opening in the wood surface.

When the defective portion has thus been removed from the veneer the collar 18 with the larger extension 22 is removed from the router frame and the collar 18ª with the relatively smaller extension 22ª substituted therefor as shown in Figures 3 and 6. A sound piece of veneer 20ª is then secured beneath the pattern 19 and the router bit 17 and extension 22ª of the collar inserted within the opening in the pattern as particularly shown in Figures 3 and 6. The extension 22ª is then moved on a horizontal plane within the opening of the pattern, being kept in constant contact with the wall 24 thereof so that the router bit will cut a groove or slot through the veneer a spaced distance from the wall 24 as shown in Figure 6. When a complete revolution has been made with the router bit within the pattern opening, a patch 27 will be completely severed from the veneer and will appear as shown in Figure 7, being of identically the same outline or contour as that of the aperture 26 in the sheet of veneer, shown in Figure 5. Therefore, it will readily be seen that as a result of the difference between the diameters of the two extensions 22 and 22ª of the collars, the edge 28 of the aperture 26, cut by the removal of a defective portion of the veneer, will coincide with the edge 29 of the patch 27 so that the patch may be snugly fitted within the aperture 26 and will become practically invisible after the surface of the veneer has been sanded and finished.

When cutting a patch from a single sheet of veneer as shown in Figures 3 and 6, a thin strip of gummed or adhesive paper 30 is preferably secured to the under side of the veneer to hold the patch in place while being cut therefrom in order to prevent it from moving before being completely severed from the sheet of veneer, which might cause the patch to splinter and thus render it useless. It is to be understood, of course, that the router bit 17 does not cut through the strip of paper when cutting out the patch. As soon as the patch has been completely formed by the operation of the router bit within the pattern opening it may readily be removed from the strip of paper for insertion in the aperture 26. It has also been found desirable in some cases to secure the patch in the aperture 26 by means of a strip of adhesive paper being secured to the back side of the sheet of veneer and adapted to overlap the edges of said aperture after the patch has been positioned therein.

In Figures 8 and 9 there is shown a form of clamp adapted to hold the patches in place within the pattern opening when a plurality of such patches are being cut at one time by placing a number of sheets of veneer one upon another. A stationary support 31, having an overhanging end-portion 32, is suitably secured to the top surface of the pattern 19ª, and functions to provide a center support for a clamping bar 33 which is adapted to be positioned beneath the overhanging end-portion 32 as shown. An adjusting screw 34 is mounted in the outer end of the clamping bar and functions to exert an upward force or pressure against the end of the bar, thereby downwardly forcing the depending end-portion 35 of the clamping bar against the patches, as particularly shown in Figure 8. This bar is used merely for holding the patch in place when the tool is nearing the end of its cut and need not be applied to the work until the patch is nearly cut out, hence it will not interfere with the operation of the tool.

In Figure 9, the pattern 19ª is shown as being provided with an opening of irregular outline, the patches cut by the use of this pattern being of a corresponding design. It is to be understood, of course, that various sizes and designs of patches may be cut by using different patterns, and if desired, a plurality of different pattern openings may be provided in a single pattern form so that various sized patches may be cut without having to remove the pattern from the router table or bench.

Thus, by the use of this novel guiding means in conjunction with a radial router, defective veneers may be patched and thereby rendered valuable at a trifling expense so that they may be utilized in the manufacture of high grade furniture and other wood specialties.

I claim as my invention:

1. The combination with a routing machine and a cutting tool or bit therefor, and a pattern having an opening adapted to receive said bit, of a guide collar to enter the opening in said pattern and bear on the wall thereof and guide the bit in cutting a recess or depression in the work, and a second guide collar of less diameter than said first-named collar for guiding the bit to cut a patch to fit said opening or depression, the difference in diameter between said collars being equal to twice the diameter of said bit whereby the patch will be cut the proper size to fit the opening.

2. The combination with a routing machine and a cutting tool or bit therefor, a pivoted support for said machine and a pattern having an opening into which the bit extends, of means in the pattern opening for guiding the bit in the work to cut out a defective portion thereof, and means for guiding the bit in the same pattern opening to cut a patch corresponding in size and outline to the opening made by the removal of the defective portion.

3. The combination with a routing machine and a cutting tool or bit therefor, a pivoted support for said machine, and a pattern having an opening into which the bit extends, of means in the pattern opening for guiding the bit in the work to cut out a defective portion thereof, and means for guiding the bit in the same pattern opening to cut a patch corresponding in size and outline to the opening made by the removal of the defective portion, said guiding means being of different diameter, the difference in such diameter being twice the diameter of said bit.

4. A method of patching veneer which consists in placing a pattern over a defective portion of the veneer, inserting a routing bit and guide therefor into the opening in the pattern and cutting out the defective portion of the veneer, the guide following the wall of the opening in the pattern, then placing the same pattern over a perfect veneer surface, inserting the routing bit, and a second relatively smaller guide therein to bear on the wall of the pattern opening and cutting out a patch of perfect veneer to exactly fit the opening made by the removal of the imperfect portion.

5. A method of inlaying a fibrous surface which consists in placing a pattern over the area to be inlaid, inserting a routing bit and guide therefor into the opening in the pattern and making a depression or recess in the fibrous surface for the inlay, the guide following the wall of the opening, in the pattern, then placing the same pattern over the surface from which the inlay is to be obtained, inserting the routing bit and a second relatively smaller guide therein to bear on the wall of the pattern opening and cutting out an inlay to exactly fit said depression or recess.

6. A method of patching veneer which consists in placing a pattern over a defective portion of the veneer, inserting a routing bit and a guide therefor into the opening in the pattern and cutting out the defective portion of the veneer, the guide following the wall of the opening in the pattern, attaching a backing to a perfect veneer surface, then placing the same pattern over the perfect veneer surface, inserting the routing bit, and a second relatively smaller guide therein to bear on the wall of the pattern opening and cutting out a patch of perfect veneer to exactly fit the opening made by the removal of the imperfect portion but leaving the backing intact.

In witness whereof, I have hereunto set my hand this 17th day of June 1924.

JOSEPH H. HISCOCK.